United States Patent
Bhatia

(10) Patent No.: US 10,223,721 B1
(45) Date of Patent: Mar. 5, 2019

(54) REQUESTING AN ITEM AVAILABLE FROM A NETWORK-BASED RESOURCE

(71) Applicant: Amazon Technologies, Inc., Seattle, WA (US)

(72) Inventor: Sandeep Bhatia, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 666 days.

(21) Appl. No.: 14/631,579

(22) Filed: Feb. 25, 2015

(51) Int. Cl.
  *G06Q 30/00* (2012.01)
  *G06Q 30/06* (2012.01)

(52) U.S. Cl.
  CPC ..... *G06Q 30/0611* (2013.01); *G06Q 30/0633* (2013.01)

(58) Field of Classification Search
  None
  See application file for complete search history.

(56) References Cited

U.S. PATENT DOCUMENTS

| | | | | |
|---|---|---|---|---|
| 6,223,185 | B1* | 4/2001 | Berkland | G06F 9/465 |
| 8,706,567 | B2* | 4/2014 | Nash | G06Q 30/0617 |
| | | | | 705/26.62 |
| 2003/0065592 | A1* | 4/2003 | Jones | G06Q 10/06 |
| | | | | 705/28 |
| 2010/0299222 | A1* | 11/2010 | Hamilton, IV | G06Q 30/0601 |
| | | | | 705/26.1 |
| 2011/0040584 | A1* | 2/2011 | Boyle | G06Q 10/02 |
| | | | | 705/5 |
| 2013/0138530 | A1* | 5/2013 | Westphal | G06Q 30/06 |
| | | | | 705/26.7 |
| 2013/0290127 | A1* | 10/2013 | Finseth | G06Q 30/0611 |
| | | | | 705/26.4 |
| 2014/0279175 | A1* | 9/2014 | Graf | G06Q 30/0611 |
| | | | | 705/26.4 |
| 2014/0324807 | A1* | 10/2014 | Wen | G06F 17/30867 |
| | | | | 707/706 |
| 2016/0180421 | A1* | 6/2016 | Wegner | G06Q 30/0611 |
| | | | | 705/80 |

FOREIGN PATENT DOCUMENTS

| | | | | |
|---|---|---|---|---|
| CA | 2358903 | * | 7/1999 | G06F 17/60 |

OTHER PUBLICATIONS

Judicial Education Center—University of New Mexico, "Elements of a Contract", Mar. 21, 2014, jec.unm.edu (http://jec.unm.edu/education/online-training/contract-law-tutorial/contract-fundamentals-part-2) (Year: 2014).*

John Paul Gutierrez; "AECsoft Solutions Overview"; 2010, AECsoft USA, Inc.; p. 14 (Year: 2010).*

* cited by examiner

*Primary Examiner* — Naeem U Haq
*Assistant Examiner* — Norman Donald Sutch, Jr.
(74) *Attorney, Agent, or Firm* — Kilpatrick Townsend & Stockton LLP

(57) ABSTRACT

Techniques for offering an item may be provided. For example, an item may be available for ordering from a network-based resource based on available offers. A request for an unavailable offer may be received. The request may be matched with a new offer that may have been generated after the request may have been received. Based on the matching, the item may be ordered from the network-based resource according to the new offer.

20 Claims, 12 Drawing Sheets

| Offer | Attributes | Request New Offer | Check Multiple Offers to Request a New Offer |
|---|---|---|---|
| Offer 1 | Attribute 1 | ☐ | ☐ |
| Offer 2 | Attribute 2 | ☐ | ☐ |
| ⋮ | ⋮ | ⋮ | ⋮ |
| Offer N | Attribute N | ☐ | ☐ |

☐ 234 — Select all

FIG. 2

Request New Offer

310 — Offer Attributes
- Price  [        ]
- Condition  [      ▽]
  ⋮
- Delivery  [      ▽]

320 — Item Attributes
- Feature  [        ]
  ⋮
- Bundle  [        ]

330 — Time Frame
- Expire  [        □]

340 — ( Submit )

REQUESTING AN ITEM AVAILABLE FROM A NETWORK-BASED RESOURCE

BACKGROUND

More and more users are turning to network-based resources, such as electronic marketplaces, to purchase items. A network-based resource may provide a user experience unmatched by a more traditional brick and mortar store. For example, the network-based resource may offer a larger and more diverse selection of items. Further, for some of the items, there may be a number of sellers with different offers. As such, a consumer may not only obtain items from an available rich selection, but may also obtain the items at preferred offers.

Typically, a seller may operate a computing device to access a network-based resource and list items with different offers as available for ordering from the network-based resource. A consumer may similarly operate a computing device to access the network-based resource, search for available items, get related descriptions, and purchase one or more items accordingly. Thereafter, purchased items may be delivered to an address or location identified by the consumer.

BRIEF DESCRIPTION OF THE DRAWINGS

Various embodiments in accordance with the present disclosure will be described with reference to the drawings, in which:

FIG. 2 illustrates an example interface for offering items, according to embodiments;

FIG. 3 illustrates an example interface for requesting an unavailable offer for an item, according to embodiments;

DETAILED DESCRIPTION

Figure 1:
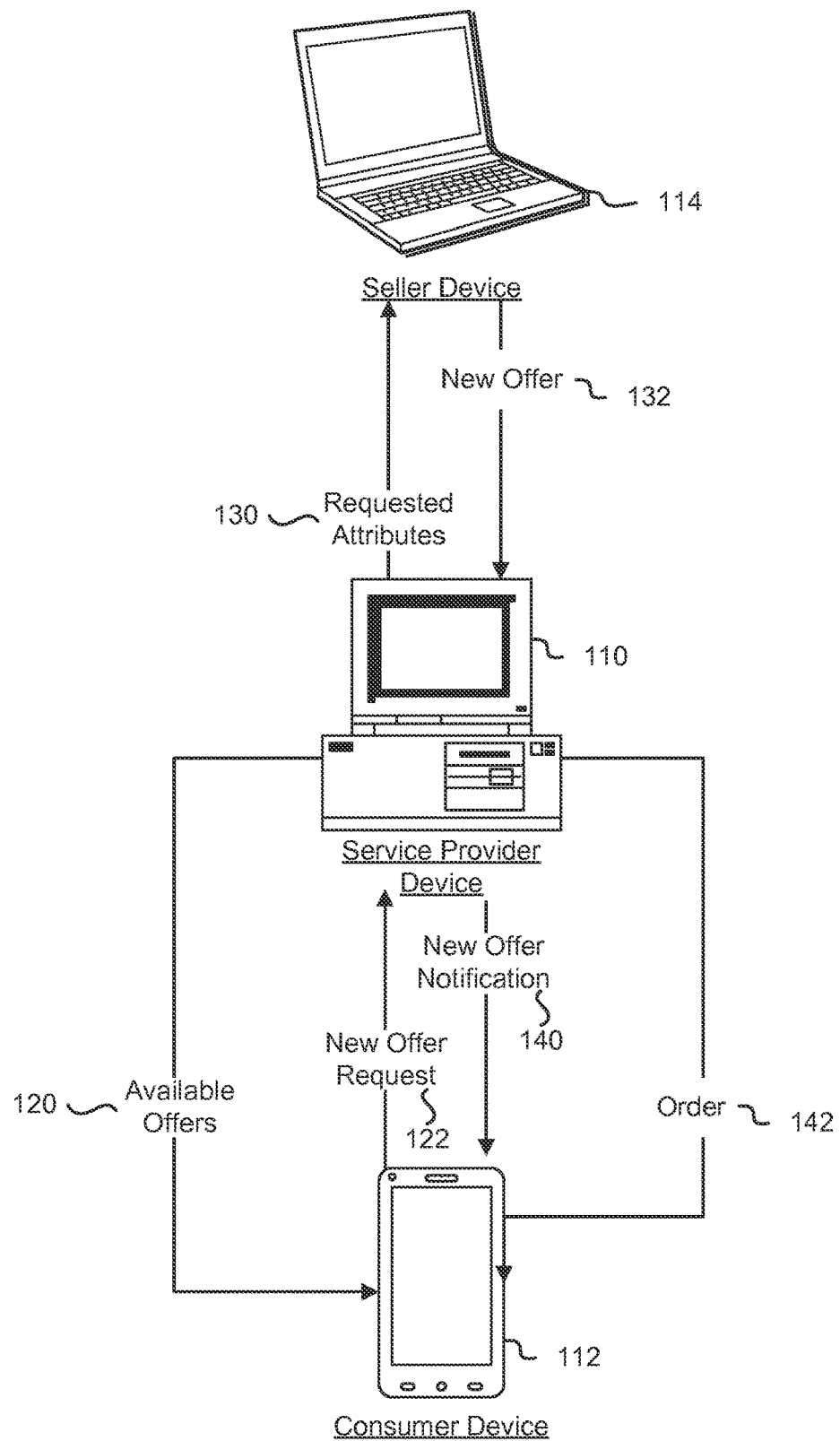
FIG. 1 illustrates an example computing environment for offering items at a network-based resource, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a seller's experience when, for example, offering items at a network-based resource (e.g., an electronic marketplace) and to enhancing a consumer's experience when, for example, ordering an item offered at the network-based resource. A consumer may operate a computing device to access and order items offered from sellers at the network-based resources. The consumer may search for an item and browse different available offers at the network-based resource. However, in certain situations, the consumer may not find an offer that may meet the consumer's preferences. For example, the consumer may not find an offer with a preferred set of attributes, such as a desired price, a preferred delivery method, and/or a well rated seller. Accordingly, the consumer may turn away from the network-based resource and look to purchase the item from a different resource. To avoid such an outcome, an option may be provided to the consumer to request the item according to a currently unavailable (e.g., absent or non-existent) offer from the network-based resource. The option may allow the consumer to specify attributes associated with the unavailable offer. For example, the consumer may indicate that the item would be ordered if the price was within a certain range, a certain delivery method was available, and/or if the seller has a particular rating. In turn, an offer subscription may be generated and may capture the preferred attributes. When a seller lists a new offer for the item at the electronic marketplace, the new offer may be compared to the attributes. If there is a match, a notification may be sent to the computing device associated the consumer. The notification may alert the consumer that the item may be available according to the consumer's previously provided preferences and may allow the consumer to review the new offer and order the item accordingly.

To illustrate, by operating a computing device, a consumer may access an electronic marketplace over a network and search for a particular camera brand and model. The electronic marketplace may return a list of offers of sellers. Next to each offer, the electronic marketplace may also provide a link for requesting a different offer. If the consumer is dissatisfied with any of the available offers (e.g., none has a seller rating of five stars), the consumer may click on the link next to what may be perceived as the best available offer (e.g., the offer with the lowest price). In turn, the electronic marketplace may provide a webpage to the computing device. The webpage may list the attributes of the best available offer (e.g., the price, the seller rating, the delivery method, a cost associated with the delivery method, and other offer-related attributes). The webpage may also allow the consumer to update any of the attributes and submit a request for an offer based on the updated attributes. As such, the consumer may change the seller rating to five stars and submit the request. The electronic marketplace may receive and store the request. When a seller lists a new offer for the camera, the new offer may be compared to the stored request. If the attributes match (e.g., the seller associated with the new offer has a five star rating, along with the remaining attributes of the new offer meeting or exceeding the corresponding attributes of the request), an email may be sent to an email address of the consumer. The email may inform the consumer that the new offer meets the request and may include a link to order the item. By clicking on the link, the consumer may be able to order the item according to the new offer.

In the interest of clarity of explanation, the embodiments are described in the context of an electronic marketplace, service providers, items, sellers, and consumers. Nevertheless, the embodiments may be applied to any network-based resource (e.g., a web site or a web page), any item that may be tangible (e.g., a product) or intangible (e.g., a service or a digital product), any service provider (e.g., a provider of a network-based resource or a provider that may provide an item), any seller (e.g., an item provider, a merchant, or any user offering an item at an electronic marketplace), and/or any consumer (e.g., an item recipient, a buyer, or any user reviewing, ordering, obtaining, purchasing, or returning an item). More particularly, the embodiments may allow requesting an unavailable offer for an item from a network-based resource, matching the unavailable offer with a new offer, and allowing the item to be ordered based on the new offer. These and other features are further described herein below with reference to the figures.

In addition to improving the seller's and consumer's experiences, the embodiments may improve the underlying computing environment associated with the network-based resource. For example, to offer items, it may be necessary to maintain records of the different offers. Maintaining the records may use computing resources, such as processing power to generate and update the records and memory space to store the records. By allowing consumers to request unavailable offers and matching seller's new offers with such requests, consumer preferences and needs and seller capabilities may be better understood. This understanding may be used to improve and, in certain situations, limit offers for items to matches between the consumer preferences and needs with the seller capabilities. Thus, by improving or limiting the offers, the amount of records that should be maintained may be reduced. This reduction may in turn result in a reduction of the processing power and memory space consumption, thereby improving the use of the underlying computing environment.

Turning to FIG. 1, the figure illustrates an example computing environment for requesting an unavailable offer and matching such a request with a new offer. In particular, a service provider may operate a service provider device 110 as part of providing an electronic marketplace. In turn, a consumer may operate a consumer device 112 to access the electronic marketplace over a network. This access may include establishing a connection and exchanging data with the service provider device 110. Similarly, a seller may operate a seller device 114 to access the network marketplace over a network. For example, the seller device 114 may be in communication with the service provider device 110 to list offers for items available for ordering from the electronic marketplace. Aspects of each of these devices and associated operations and interactions are further described herein next.

The service provider device 110 may represent a computing device suitable to host services associated with the electronic marketplace. For example, the service provider device 110 may be a server, a cluster of servers, or a server farm implemented on a collection of physical and/or virtual computing resources. In comparison, the consumer device 112 may represent a computing device suitable to host different applications, such as a web browser and/or an application for a voice interface, to interact over a network with the electronic marketplace (e.g., with one or a combination of services hosted on the service provider device 110) and, for instance, order an item offered thereat. In an example, the consumer device 112 may include any or a combination of a mobile phone, a smart phone, a personal digital assistant (PDA), a laptop computer, a desktop computer, a thin-client device, a tablet PC, etc. Similarly, the seller device 114 may represent a computing device suitable to host different applications, such as a web browser, to interact over a network with the electronic marketplace (e.g., with one or a combination of services hosted on the service provider device 110) and, for instance, list an offer for an item as available for ordering from the electronic marketplace. In an example, the seller device 114 may also include a mobile phone, a smart phone, a personal digital assistant (PDA), a laptop computer, a desktop computer, a thin-client device, a tablet PC, etc.

In an embodiment, a consumer may operate the consumer device 112 to interact with the electronic marketplace, such as to browse, search, and order items. The service provider device 110 may provide (e.g., transmit) data about available offers 120 to the consumer device 112. An available offer 120 may represent an existing offer for an item that may have been listed by one or more sellers prior to the consumer's search for the item. An offer may be associated with multiple attributes. Attributes may allow comparison of offers. Some attributes may be accessible (e.g., viewable) to consumers such as price, seller rating, delivery method, and other attributes as further illustrated in FIG. 3. In turn, the consumer device 112 may present (e.g., display) the available offers to the consumer within a network-based document (e.g., as part of a webpage). Other attributes may not be accessible to the consumers. Instead, these attributes may be accessible and used internally to the service provider device 110 to, for example, compare offers. Examples of this type of attributes may include weights, scores, or other metrics that the service provider device 110 may use.

If none of the available offers meets the consumer's preference, the consumer may request an unavailable offer. An unavailable offer may represent an offer that may differ from the available offers by at least one attribute. As such, the unavailable offer may represent an absent offer that may not be obtainable from the available offers. In other words, the unavailable or absent offer may correspond to a currently non-existent offer. The request may be enabled by the network-based document. For example, the network-based document may provide selectable options (e.g., webpage links) to make such a request. An example of this network-based document is further illustrated in FIG. 2. If the consumer selects one or more of the selectable options, data about a new offer request 122 may be transmitted to the service provider device 110. The new offer request 122 may define the requested attributes of the unavailable offer. An example of how these attributes may be defined is further illustrated in FIG. 3.

Figure 4:
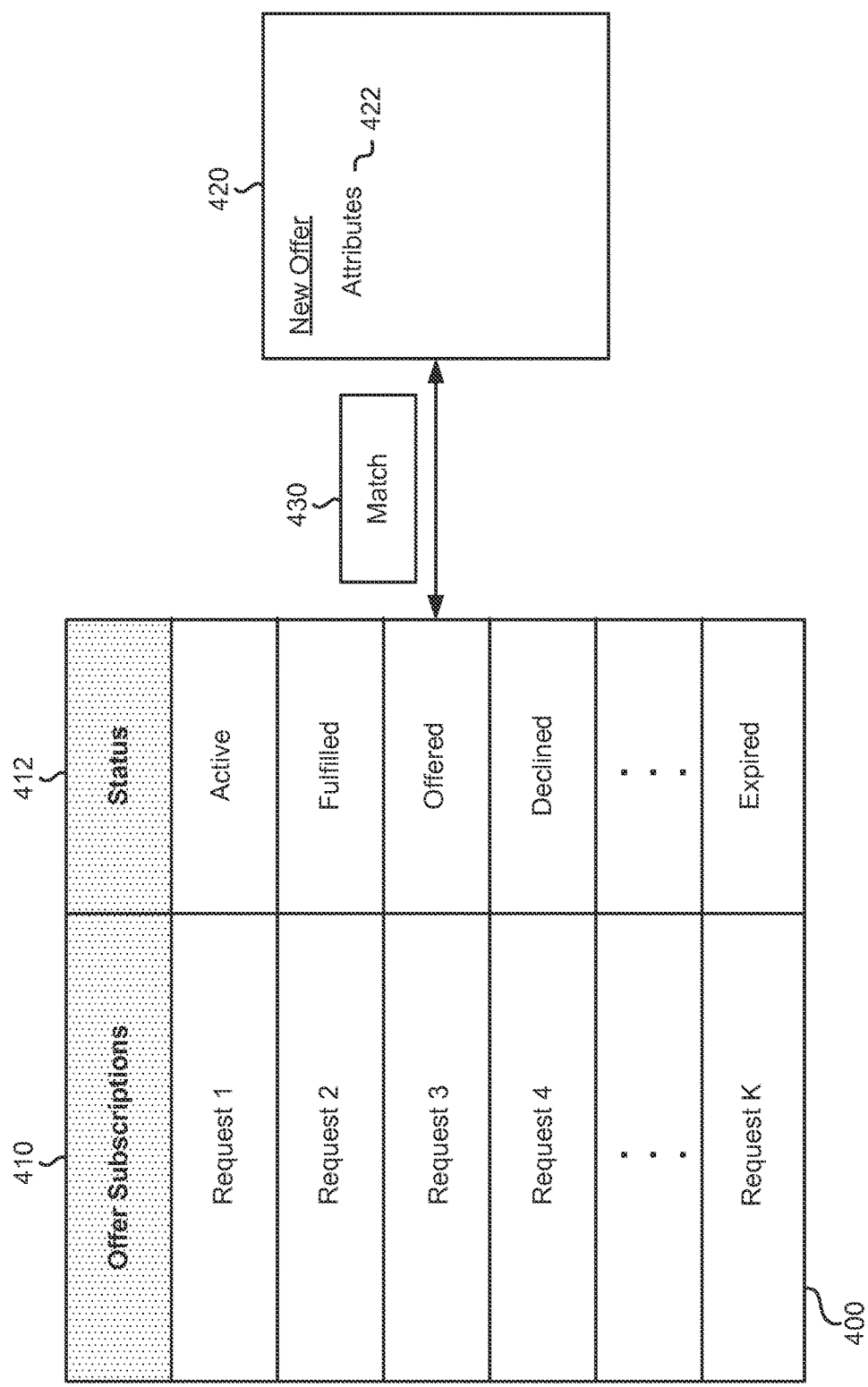
FIG. 4 illustrates an example offer subscription that can be matched to an offer, according to embodiments.

When the service provider device 110 receives the data about the new offer request 122, the service provider device 110 may generate and store an offer subscription associated with this request. The offer subscription may represent a record of the request and may include, among other information, the requested attributes. FIG. 4 illustrates an example of the offer subscription.

Further, the service provider 110 may provide (e.g., transmit) data about requested attributes 130 to the seller device 114. This can be performed on demand (e.g., per request from the seller device 114) or based on a push (e.g., at time intervals, this data may be pushed to the seller device 114). The requested attributes 130 may represent the attributes of the unavailable offer. In an example, the requested attributes 130 may be determined from the offer subscription. In another example, the subscription order and/or the request itself may be provided instead.

The seller operating the seller device 114 may list a new offer 132 at the electronic marketplace by providing data about the new offer to the service provider device 110. The new offer 132 may be associated with various attributes (e.g., price, delivery method, seller rating, etc.). Typically, the new offer may be generated and/or listed after the new offer request 122 may have been made. In an example, the seller may generate the new offer 132 based on receiving the data about the requested attributes 130. In this example, the seller may generate the new offer 132 to specifically match or exceed the requested attributes 130. In another example, the seller may generate the new offer 132 independently of the requested attributes. In both examples, the service provider may match the new offer 132 to the offer subscription, or similarly to the new request offer 122, by comparing the associated attributes. If there is a match (e.g., the new offer 132 meets or exceeds the requested attributes 130), the service provider 110 may provide (e.g., transmit) data about the new offer 132 to the consumer device 112 (or any other device or address associated with an account of the consumer at the electronic marketplace). This data may be provided as a new offer notification 140. The new offer notification 140 may represent a notification identifying that the new offer request 122 may have been matched to the new offer 132 and allowing an order to be placed for the item from the electronic marketplace according to the new offer 132. An example of the new offer notification 140 is further illustrated in FIG. 5.

In turn, by operating the consumer device 112, the consumer may access the new offer notification 140, review the new offer 132, and place an order 142 for the item according to the new offer 132. Various types of the order 142 may be available, as further described in FIG. 5, such as a zero-click, a one-click, or a multiple-click purchase.

Hence, by allowing requests for unavailable offers and by matching such requests to new offers, consumers may be able to order items according to consumer preferences. Further, sellers may be able to generate offers that meet specific consumer preferences. This may enhance the overall consumer's and seller's experiences.

Turning to FIG. 2, the figure illustrates a network-based document 200 configured to present available offers and one or more options to request an unavailable offer. The network-based document 200 may represent an interface for presenting the various types of data available from an electronic marketplace to a consumer at a consumer device. In an example, the network-based document 200 may be a webpage provided as part of the electronic marketplace. For instance, the consumer device may execute a browser application and connect to the electronic marketplace to retrieve and display the data as part of the network-based document 200 within a user interface. It should be apparent to a person of ordinary skill in the art that other applications or processes may be used such as, for example, an application programming interface (API).

Generally, the network-based document 200 may be configured to facilitate consumer interactions, such as browsing, searching, and viewing available offers for items from the electronic marketplace and requesting unavailable offers. As illustrated, the network-based document 200 may include multiple fields. A "search" field 210 may allow a search for an item. An "offer" field 220 may list the different available offers for that item. The listed offers may summarize the available offers. Accordingly, the offer field 220 may be selectable (e.g., linked to another webpage). When any of the available offers are selected, the summary can be expanded to provide more information about the offer (e.g., the other webpage may be presented).

In comparison, an "attributes" field 222 may list the different attributes for each of the available offers, such as a price of the item, a condition of the item, a consumer rating of the item, a rating of a seller of the item, a delivery method, whether the item may be available for ordering based on a membership at the electronic marketplace, a technical feature of the item, and other offers or item-related attributes. Similarly to the offer field 220, the attributes field 220 may also be selectable.

In addition to these three fields 210 and 220-222, the network-based document 200 may further present one or more fields 230-234 for requesting an unavailable offer. These fields 230-234 are shown in FIG. 2 with a dotted line to illustrate that a combination of one or more of these fields 230-234 may be implemented. Each of these fields 230-234 may represent a selectable option that, when selected, provides another network-based document for defining attributes of the unavailable offer as further illustrated in FIG. 3. Further, depending on which one of the fields 230-234 may be selected, the attributes of the unavailable offer may be pre-populated differently.

Turning to these fields 230-234 in detail, the "request new offer" field 230 may provide selectable options, each one corresponding to one of the available offers. Selection of multiple options may be mutually exclusive. By selecting one option corresponding to an available offer, a new offer request may be generated where attributes of this request may be pre-populated based on the attributes of the corresponding available offer (and, optionally, based on additional data as further illustrated in FIGS. 8-9). In comparison, the "select multiple offers to request a new offer" field 232 may be similar to the request new offer field 230, except that this field 232 may allow a multi-selection of available offers. By selecting multiple available offers, a new offer request may be generated, where attributes of this request may be pre-populated based on the collective attributes (e.g., the best overall attributes—lowest price, highest seller ratings, etc.—or an average, etc.) of the selected offers (and, optionally, based on additional data as further illustrated in FIGS. 8-9). Similarly, the "select all" field 234 may represent a shortcut to select all of the options. This may result in generating a new offer request with pre-populated attributes based on the collective attributes of all of the available offers.

FIG. 3 illustrates another example of a network-based document 300. This network-based document 300 may be configured to allow requesting an unavailable offer. This may include defining attributes of the unavailable offer and submitting a request. Defining the attributes may include reviewing and editing pre-populated (if any) attribute values. The editing may be subject to constraints. Submitting the request may represent a confirmation that the attribute values correspond to preferences of a consumer regarding the unavailable offer.

As illustrated in FIG. 3, there may be different types of attributes associated with the unavailable offer including offer-based attributes 310, item-based attributes 320, and time-based attributes 330. The offer-based attributes 310 may represent attributes related to the unavailable offer itself. For example, the offer-based attributes 310 may include an offered price of the item (e.g., a specific price or a price range), an offered condition of the item (e.g., new, used, refurbished, etc.), a rating of a seller of the item (e.g., a minimum acceptable rating), a delivery method (e.g., two-day shipping), whether the item is to be offered with a membership at the electronic marketplace, etc. In comparison, the item-based attributes 320 may represent attributes related to the item itself. For example, the item-related attributes 320 may include a technical feature of the item (e.g., an optical zoom of a camera), a choice to bundle the item with another item(s) (e.g., bundle the camera with an SD card), a consumer rating of the item (e.g., a minimum acceptable rating), technical features of other similar items (e.g., an item belonging to a same category, class, or family of items), etc. The time-based attributes 330 may represent attributes related to how long the request of the unavailable item may be active. For example, the time-related attributes 330 may include an expiration date of the request, start and end dates during which the request is active, etc. Other types of attributes may also be used. For example, cross item-based attributes (not shown in FIG. 3) may be presented. A cross item-based attribute may represent attributes related to available offers of similar items.

The attributes 310-330 may have attribute values that may define them. For example, a value of a price attribute may be the requested price (or price range). When the network-based document 300 is initially presented, some or all of these values may be set to a default value, pre-populated, or left blank. In an example, the attribute values are pre-populated based on the way that a request for the unavailable offer was placed (e.g., as illustrated by the three request fields 230-234 of FIG. 2) and based on, optionally, offer, item, and/or consumer-related data as further described in FIGS. 8-9.

Further, the network-based document 300 may allow a consumer to update or edit some or all of the attribute values (e.g., to input an actual value for a requested price). Changes to the attribute values can be constrained according to attribute-specific constraints. For example, a price attribute can be constrained such as the requested price can be no less than a certain percentage (e.g., ten percent) of the lowest price from the available offers or that it may not be set to zero. In comparison, a condition attribute can be constrained to take one of three values: new, used, or refurbished. These constraints can be imposed by, for example, providing a drop down menu to select a value from predefined values, by alerting the consumer if an incorrect value was entered, and/or by providing an explanation next to each attribute describing the constraint.

The network-based document 300 may also include a "submit" field 340. This field may represent a selectable option (e.g., a link) to submit the request for the unavailable offer with the requested attributes 310-330. By selecting the submit field 340, data about the request (e.g., the attributes and the requested attribute values) may be provided (e.g., transmitted) from the consumer device to a service provider device associated with the electronic marketplace.

Turning to FIG. 4, the figure illustrates example offer subscriptions. In particular, a service provider device associated with an electronic marketplace may receive requests for unavailable offers from one or more consumer devices. When a request is received, the service provider device may generate an offer subscription corresponding to the request. This offer subscription may be stored as a record at a memory location accessible to the service provider device (e.g., at a local memory, at a data store, etc.). In an example, each offer subscription may be stored as an individual record. In another example, various offer subscriptions may be listed in a same record (as illustrated in FIG. 4).

Various types of data may be stored in a record for an offer subscription. For example, the record may include an offer subscription identifier 410 and a status 412. The offer subscription identifier 410 may identify the offer subscription. The status 412 may identify a current status of the offer subscription. For example, an "active" status may indicate that the offer subscription may not have been matched and may not have expired yet. A "fulfilled" status may indicate that the offer subscription may have been matched to a new offer and that a consumer may have ordered an item accordingly. An "offered" status may indicate that the offer subscription may have been matched to a new offer, that a consumer may have been alerted of the match, but that the consumer may not have ordered an item yet. A "similar" status may indicate that the offer subscription may be similar to a new offer such as when, for example, the match to the new offer may not be exact and, instead, differ within an acceptable similarity range. A "declined" status may indicate that the offer subscription may have been matched to a new offer and that a consumer may have declined to order an item accordingly. An "expired" status may indicate that the offer subscription may have expired.

In addition to the offer subscription identifier 410 and the status 412, other types of data associated with an offer subscription may be stored. For example, the requested attributes (including the values) may be stored. Similarly an item identifier that may identify the item, a consumer account identifier that may identify a requesting consumer, a seller identifier that may identify a seller of the item, and other identifiers may also be stored.

As further illustrated in FIG. 4, the service provider device may also receive a new offer 420. The new offer may list various attributes 422 including, for example, offer-based and item-based attributes. A match 430 may be found by comparing the new offer 420 to a record(s) of offer subscriptions. For example, active offer subscriptions may be determined. Attributes of these offer subscriptions may be compared to the attributes 422 of the new offer. If the attributes match (e.g., the attribute values of the offer meet or exceed the requested attribute values), the new offer 420 may be matched to the corresponding offer subscription(s). The match 430 may result in notifying the associated consumers of the new offer (e.g., by sending notifications to the consumer accounts, to addresses of the consumers, or to consumer devices).

Figure 5:
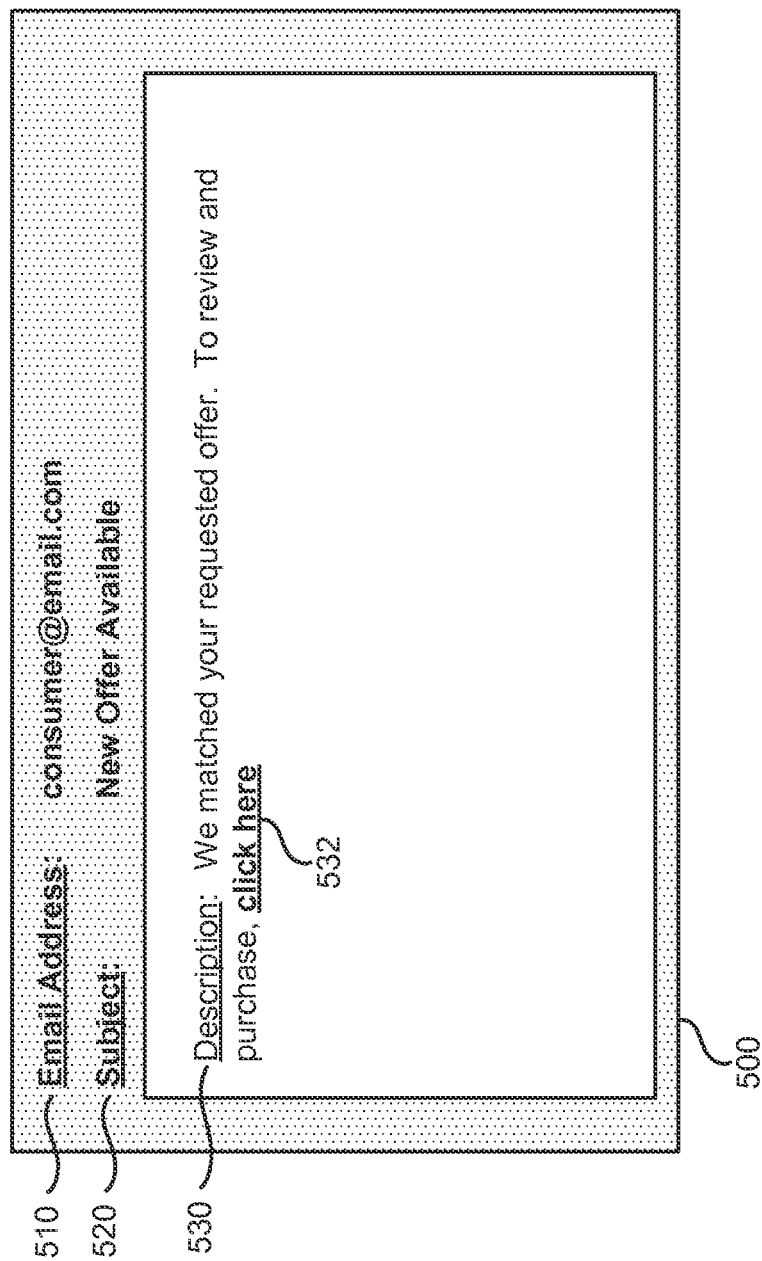
FIG. 5 illustrates an example computing environment associated with an electronic marketplace, according to embodiments.

FIG. 5 illustrates an example of a notification that may be provided to notify of a match between a request for an unavailable offer and a new offer for an item from an electronic marketplace. In this example, the notification may include an email 500. However, it should be apparent to one of ordinary skill in the art to implement other types of notifications in light of the embodiments described herein. For example, a text message, a phone call, an application alert (e.g., a textual or audible alert within a native application associated with the electronic marketplace), a recommendation in a session with the electronic marketplace, or other types of notifications may be used.

The email 500 may include an email address 510, a subject line 520, and a description 530. The email address 510 may be determined from a consumer account associated with the request for the unavailable offer. The subject line 520 may indicate that the request may have been matched to a new offer. In comparison, the description 530 may further describe the match and indicate that the new offer may meet or exceed the consumer's preferences.

Additionally, the description 530 may include a selectable option 532 (e.g., a link) to order the item. The selectable option 532 may be configured using different techniques. In one example, the selectable option 532 may use multiple clicks to order the item. For instance, by selecting the selectable option 532, details of the new offer may be provided from the electronic marketplace with a link to purchase the item based on the new offer. In another example, the selectable option 532 may use a single click to order the item. Because the new offer may meet or exceed the request, by selecting the selectable option 532, the item may be automatically purchased based on the new offer. In yet another example, the selectable option 532 may use a zero click to order the item. In this example, when the request is matched to the new offer, the item may be automatically purchased based on the new offer for the consumer. The subject line 520 and the descriptions 530 may indicate this automatic purchase. The selectable option 532 may allow the consumer to cancel the automatic purchase.

Hence, by implementing the example interfaces, records, matching, and notifications as described in FIGS. 2-5, a service provider device associated with an electronic marketplace may enable requests for unavailable offers, matches of the requests to new offers, and ordering of items according to the matched new offers. These various features may include interactions with consumer and seller devices as facilitated by the service provider device.

Figure 6:
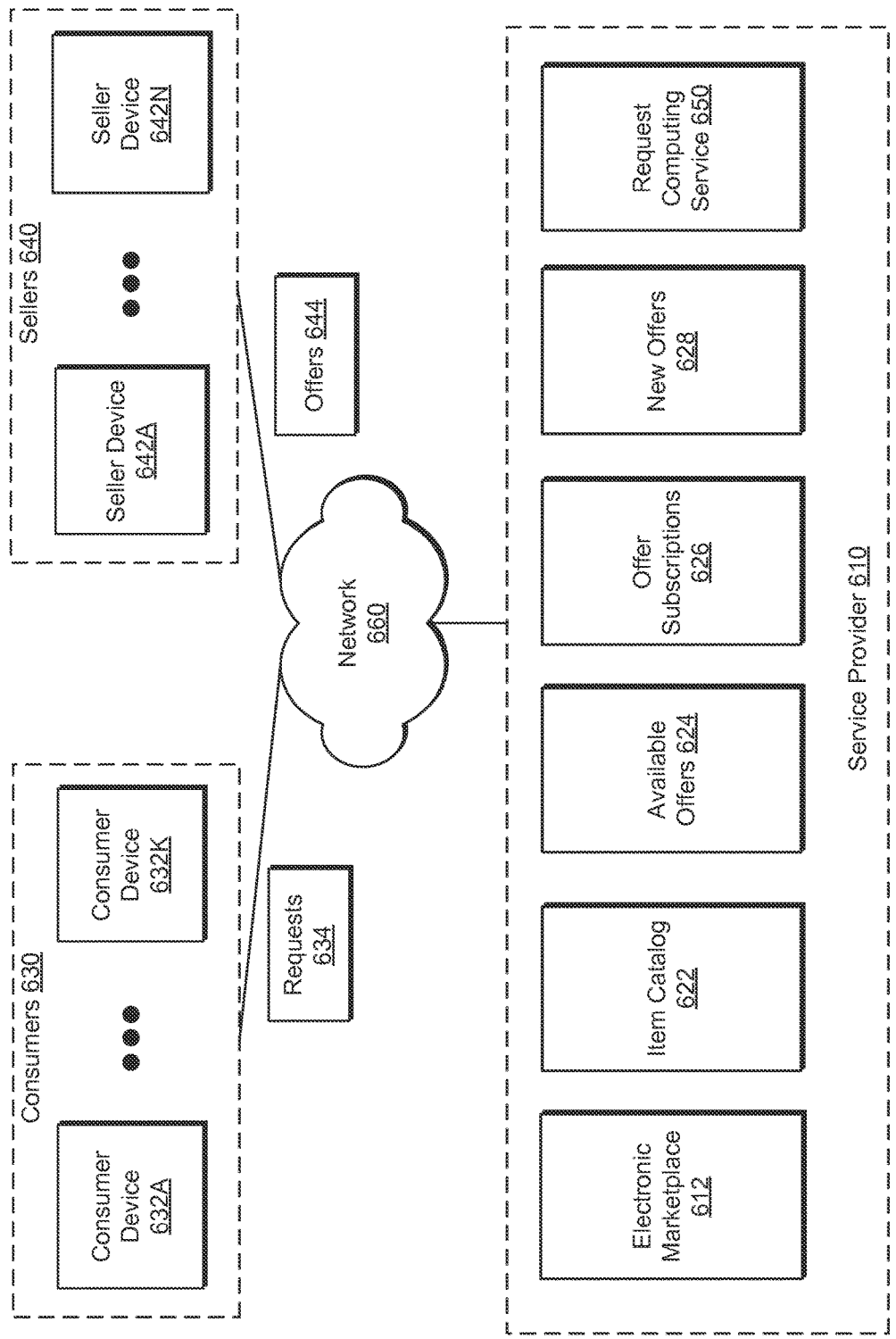
FIG. 6 illustrates an example architecture for providing a network-based resource, including at least one user device and/or one or more service provider devices connected via one or more networks, according to embodiments.

Turning to FIG. 6, that figure illustrates a computing environment for implementing the above described features within the context of an electronic marketplace. In particular, a service provider 610 of an electronic marketplace 612 may implement a request computing service 650 on a service provider device (e.g., the service provider device 110) to enable requests for unavailable offers, matches of the requests to new offers, and ordering of items according to the matched new offers.

The electronic marketplace 312 may offer different items. Offered items may be cataloged in an item catalog 622. In addition, the offered items may be ordered from the electronic marketplace 612 according to available offers 624. The available offers 624 may use data from the item catalog 622 to describe some of the item attributes and offer attributes.

A network-based document (e.g., a web page) of the electronic marketplace 612 may be associated with an item. For example, the network-based resource document may allow the sellers 640 and/or the service provider 610 to provide information for ordering an item. This may include the sellers listing offers 644 at the electronic marketplace 612. The network-based resource document may also allow the consumers 630 to review this information and make an order or purchase decision. The consumers 630 may also submit requests 634 for unavailable offers. In an example, the network-based resource document may present information from the item catalog 622 for the available offers 624.

The request computing service 650 may be configured to receive the requests 634 from consumer devices 632A-K of consumers 630 and offers 644 from seller devices 642A-N of sellers 640. The requests 634 may be for unavailable offers for items from the electronic marketplace 612. In such a case, the request computing service 650 may generate and maintain offer subscriptions 626 based on the requests 634. The request computing service 650 may also match the offer subscriptions 626 to new offers 628. These new offers 628 may correspond to a portion of the offers 644 that may not have become available (e.g., may not have been listed at the electronic marketplace 612) until after the generation of the offer subscriptions 626.

As such, the service provider 610 may operate the electronic marketplace 612 to facilitate interactions between the service provider 610, the consumers 630, and the sellers 640 over a network 660. Each one of the sellers 640 may operate one or more seller devices 642A-N to access the electronic marketplace 612 and perform various seller-related functions. A consumer may be an item recipient, a buyer, or any user reviewing, browsing, ordering, obtaining, purchasing, or returning an item of a seller. Each one of the consumers 630 may operate one or more consumer devices 632A-K to access the electronic marketplace 612 and perform various consumer-related functions.

Figure 7:
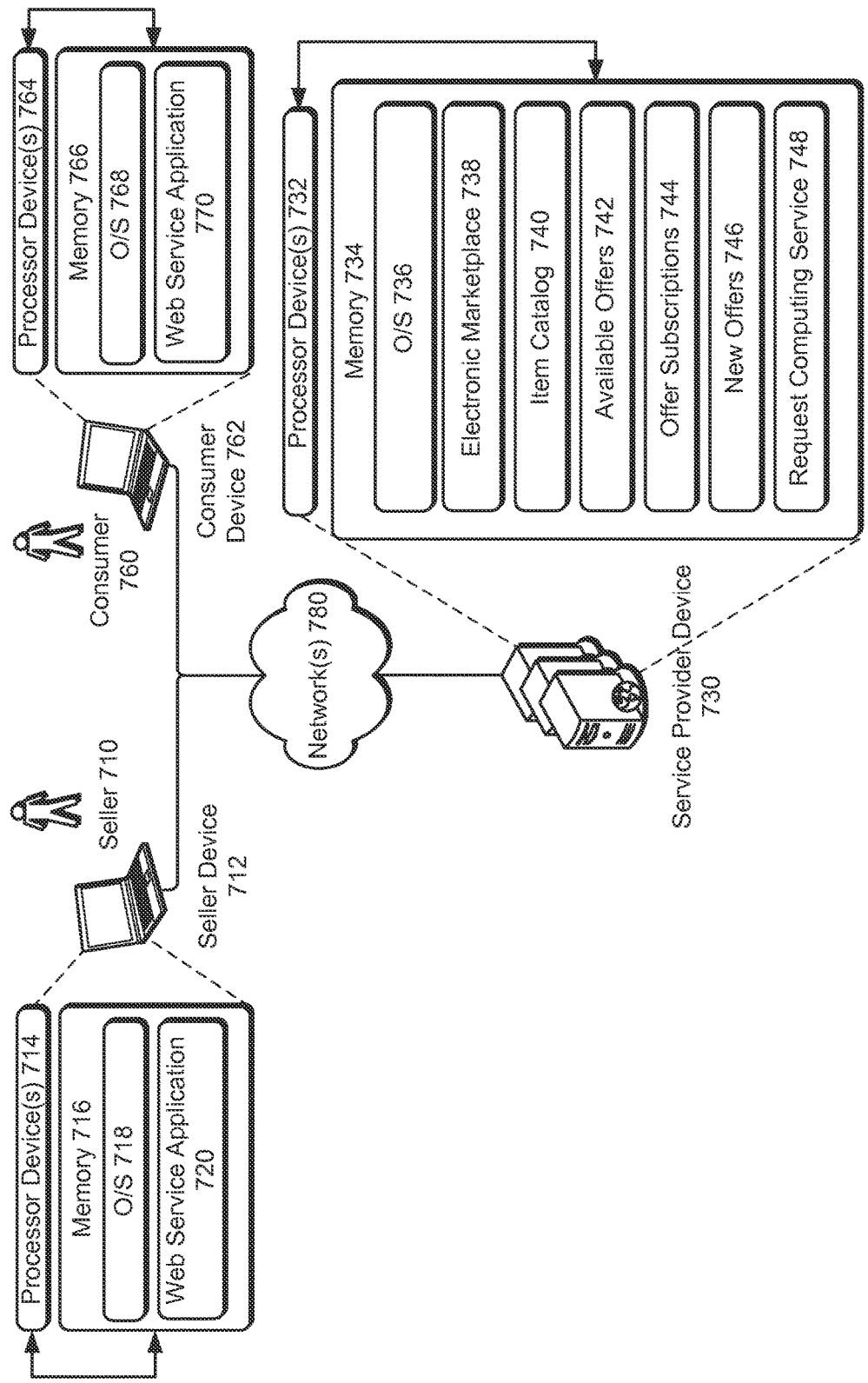
FIG. 7 illustrates an example flow for offering an item from a network-based resource, according to embodiments.

Turning to FIG. 7, that figure illustrates an example end-to-end computing environment for enabling requests for unavailable offers, matches of the requests to new offers, and ordering of items according to the matched new offers. In this example, a service provider may implement a request computing service, such as the request computing service 650 of FIG. 6, within the context of, for example, an electronic marketplace available to users, such as the consumers 630 and the sellers 640 of FIG. 6.

In a basic configuration, a seller 710 may utilize a seller device 712 to access local applications, a web service application 720, a seller account accessible through the web service application 720, a web site or any other network-based resources via one or more networks 780. In some aspects, the web service application 720, the web site, and/or the seller account may be hosted, managed, and/or otherwise provided by one or more computing resources of the service provider, such as by utilizing one or more service provider devices 730. The seller 710 may use the local applications and/or the web service application 720 to interact with the network-based resources of the service provider. These transactions may include, for example, offering items for sale.

In some examples, the seller device 712 may be any type of computing devices such as, but not limited to, a mobile phone, a smart phone, a personal digital assistant (PDA), a laptop computer, a thin-client device, a tablet PC, etc. In one illustrative configuration, the seller device 712 may contain communications connection(s) that allow the seller device 712 to communicate with a stored database, another computing device or server, seller terminals, and/or other devices on the networks 780. The seller device 712 may also include input/output (I/O) device(s) and/or ports, such as for enabling connection with a keyboard, a mouse, a pen, a voice input device, a touch input device, a display, speakers, a printer, etc.

The seller device 712 may also include at least one or more processing units (or processor device(s)) 714 and one memory 716. The processor device(s) 714 may be implemented as appropriate in hardware, computer-executable instructions, firmware, or combinations thereof. Computer-executable instructions or firmware implementations of the processor device(s) 714 may include computer-executable or machine-executable instructions written in any suitable programming language to perform the various functions described.

The memory 716 may store program instructions that are loadable and executable on the processor device(s) 714, as well as data generated during the execution of these programs. Depending on the configuration and type of seller device 712, the memory 716 may be volatile (such as random access memory (RAM)) and/or non-volatile (such as read-only memory (ROM), flash memory, etc.). The seller device 712 may also include additional storage, which may include removable storage and/or non-removable storage.

The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 716 may include multiple different types of memory, such as static random access memory (SRAM), dynamic random access memory (DRAM), or ROM.

Turning to the contents of the memory 716 in more detail, the memory may include an operating system (O/S) 718 and the one or more application programs or services for implementing the features disclosed herein including the web service application 720. In some examples, the seller device 712 may be in communication with the service provider devices 730 via the networks 780, or via other network connections. The networks 780 may include any one or a combination of many different types of networks, such as cable networks, the Internet, wireless networks, cellular networks, and other private and/or public networks. While the illustrated example represents the seller 710 accessing the web service application 720 over the networks 780, the described techniques may equally apply in instances where the seller 710 interacts with the service provider devices 730 via the seller device 712 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a consumer 760 may utilize consumer device 762 to access local applications, a web service application 770, a consumer account accessible through the web service application 770, a web site, or any other network-based resources via the networks 780. In some aspects, the web service application 770, the web site, and/or the user account may be hosted, managed, and/or otherwise provided by the service provider devices 730 and may be similar to the web service application 720, the web site accessed by the computing device 712, and/or the seller account, respectively.

The consumer 760 may use the local applications and/or the web service application 770 to conduct transactions with the network-based resources of the service provider. These transactions may include, for example, searching for items offered by the seller 710 at the network-based resources, ordering items, requesting unavailable offers, ordering items based on new offers, and other transactions.

In some examples, the consumer device 762 may be configured similarly to the seller device 712 and may include at least one or more processing units (or processor device(s)) 764 and one memory 766. The processor device(s) 764 may be implemented as appropriate in hardware, computer-executable instructions, firmware, or combinations thereof similarly to the processor device(s) 714. Likewise, the memory 766 may also be configured similarly to the memory 716 and may store program instructions that are loadable and executable on the processor device(s) 764, as well as data generated during the execution of these programs. For example, the memory 766 may include an operating system (O/S) 768 and the one or more application programs or services for implementing the features disclosed herein including the web service application 770.

As described briefly above, the web service applications 720 and 770 may allow the seller 710 and consumer 760, respectively, to interact with the service provider devices 730 to conduct transactions involving items. The service provider devices 730, perhaps arranged in a cluster of servers or as a server farm, may host the web service applications 720 and 770. These servers may be configured to host a web site (or combination of web sites) viewable via the computing devices 712 and 762. Other server architectures may also be used to host the web service applications 720 and 770. The web service applications 720 and 770 may be capable of handling requests from many sellers 710 and consumers 760, respectively, and serving, in response, various interfaces that can be rendered at the computing devices 712 and 762 such as, but not limited to, a web site. The web service applications 720 and 770 can interact with any type of web site that supports interaction, including social networking sites, electronic retailers, informational sites, blog sites, search engine sites, news and entertainment sites, and so forth. As discussed above, the described techniques can similarly be implemented outside of the web service applications 720 and 770, such as with other applications running on the computing devices 712 and 762, respectively.

The service provider devices 730 may, in some examples, provide network-based resources such as, but not limited to, applications for purchase and/or download, web sites, web hosting, client entities, data storage, data access, management, virtualization, etc. The service provider devices 730 may also be operable to provide web hosting, computer application development, and/or implementation platforms, or combinations of the foregoing to the seller 710 and consumer 760.

The service provider devices 730 may be any type of computing device such as, but not limited to, a mobile phone, a smart phone, a personal digital assistant (PDA), a laptop computer, a desktop computer, a server computer, a thin-client device, a tablet PC, etc. The service provider devices 730 may also contain communications connection(s) that allow service provider devices 730 to communicate with a stored database, other computing devices or servers, seller terminals, and/or other devices on the network 780. The service provider devices 730 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 730 may be executed by one more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 730 may be in communication with the computing devices 712 and 762 via the networks 780, or via other network connections. The service provider devices 730 may include one or more servers, perhaps arranged in a cluster, or as individual servers not associated with one another.

In one illustrative configuration, the service provider devices 730 may include at least one or more processing units (or processor devices(s)) 732 and one memory 734. The processor device(s) 732 may be implemented as appropriate in hardware, computer-executable instructions, firmware, or combinations thereof. Computer-executable instruction or firmware implementations of the processor device(s) 732 may include computer-executable or machine-executable instructions written in any suitable programming language to perform the various functions described.

The memory 734 may store program instructions that are loadable and executable on the processor device(s) 732, as well as data generated during the execution of these programs. Depending on the configuration and type of the service provider devices 730, the memory 734 may be volatile (such as random access memory (RAM)) and/or non-volatile (such as read-only memory (ROM), flash memory, etc.). The service provider devices 730 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 734 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 734 in more detail, the memory may include an operating system (O/S) 736, code for the request computing service 748, code for an electronic marketplace 738, data related to an item catalog 740, data related to available offers 742, data related to offer subscriptions 744, and data related to new offers 746. Although FIG. 7 illustrates the various data as stored in the memory 734, this data or portion of the data may be additionally or alternatively stored at a storage device remotely accessible to the service provider devices 730.

Turning to FIGS. 8-11, those figures illustrate example flows for enabling requests for unavailable offers, matching the requests to new offers, and enabling orders of items according to the matched new offers. In the illustrative operations, each of the operations or functions may be embodied in, and fully or partially automated by, modules executed by one or more processor devices of a computing device, such as the request computing service 748 of the service provider device 730. Other or a combination of other computing services and modules may be additionally or alternatively used. Also, while the operations are illustrated in a particular order, it should be understood that no particular order is necessary and that one or more operations may be omitted, skipped, and/or reordered.

Figure 8:
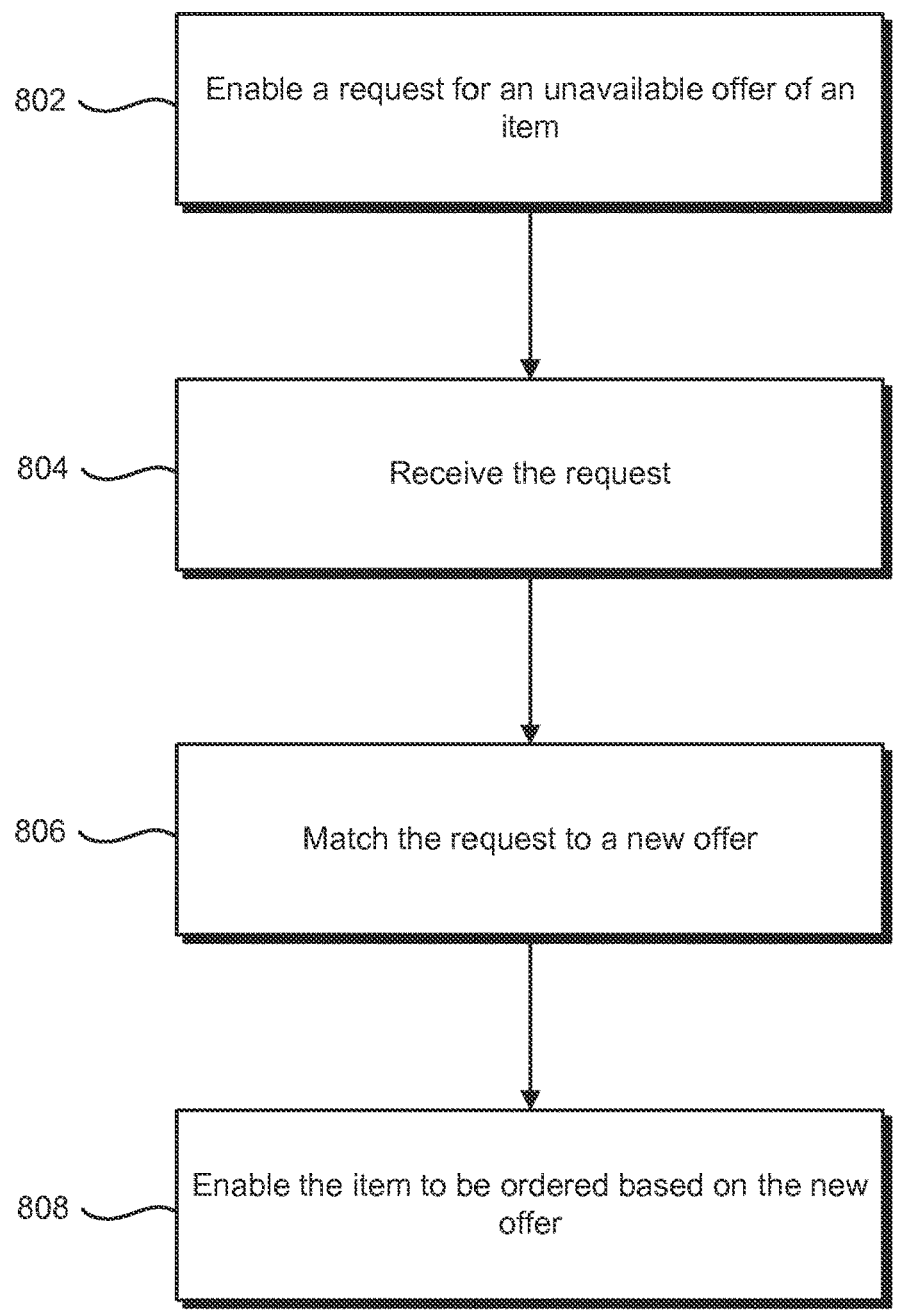
FIG. 8 illustrates an example flow for offering an item from a network-based resource, according to embodiments.
Figure 9:
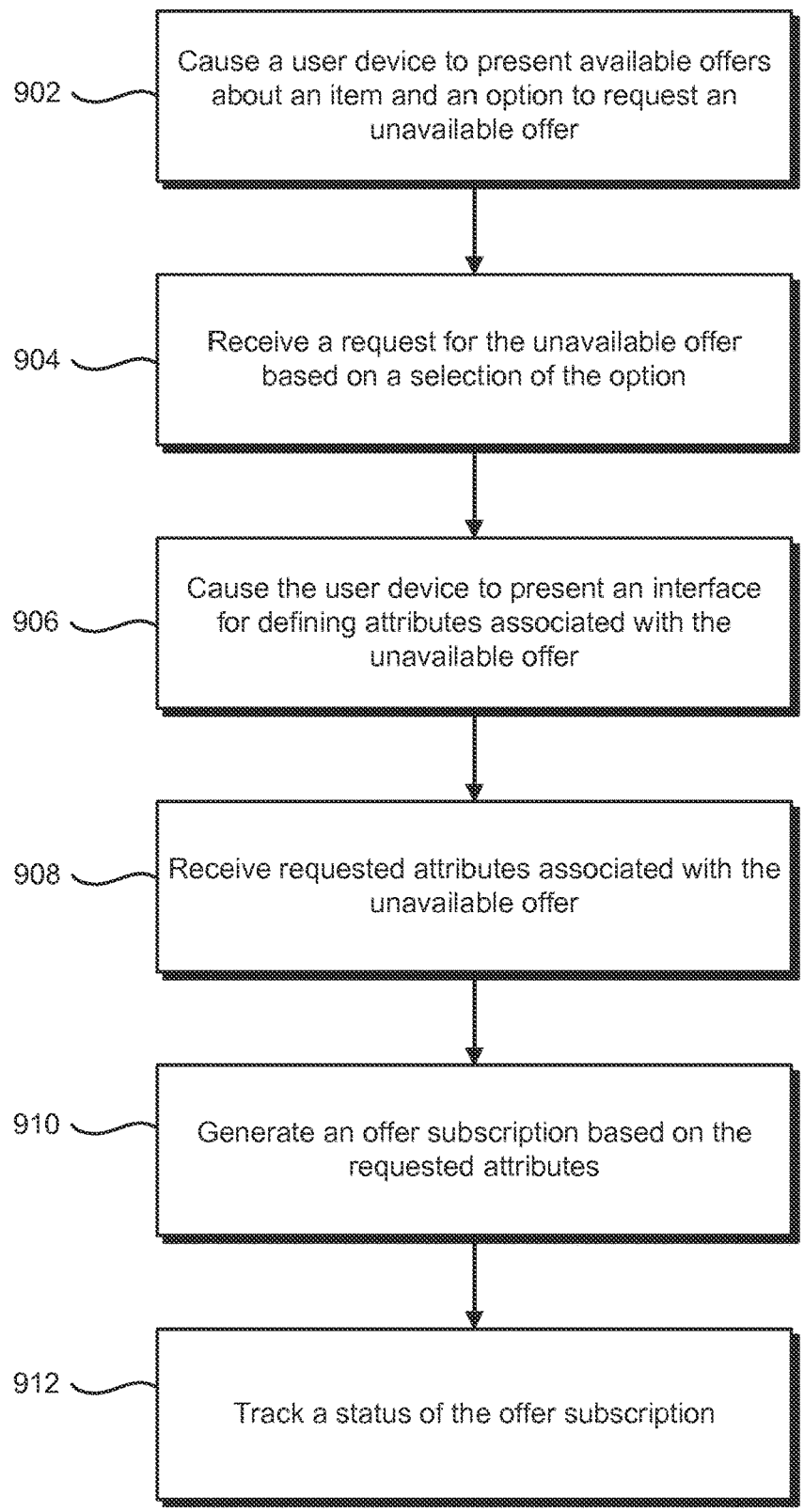
FIG. 9 illustrates an example flow for requesting an unavailable offer for an item from a network-based resource, according to embodiments.
Figure 10:
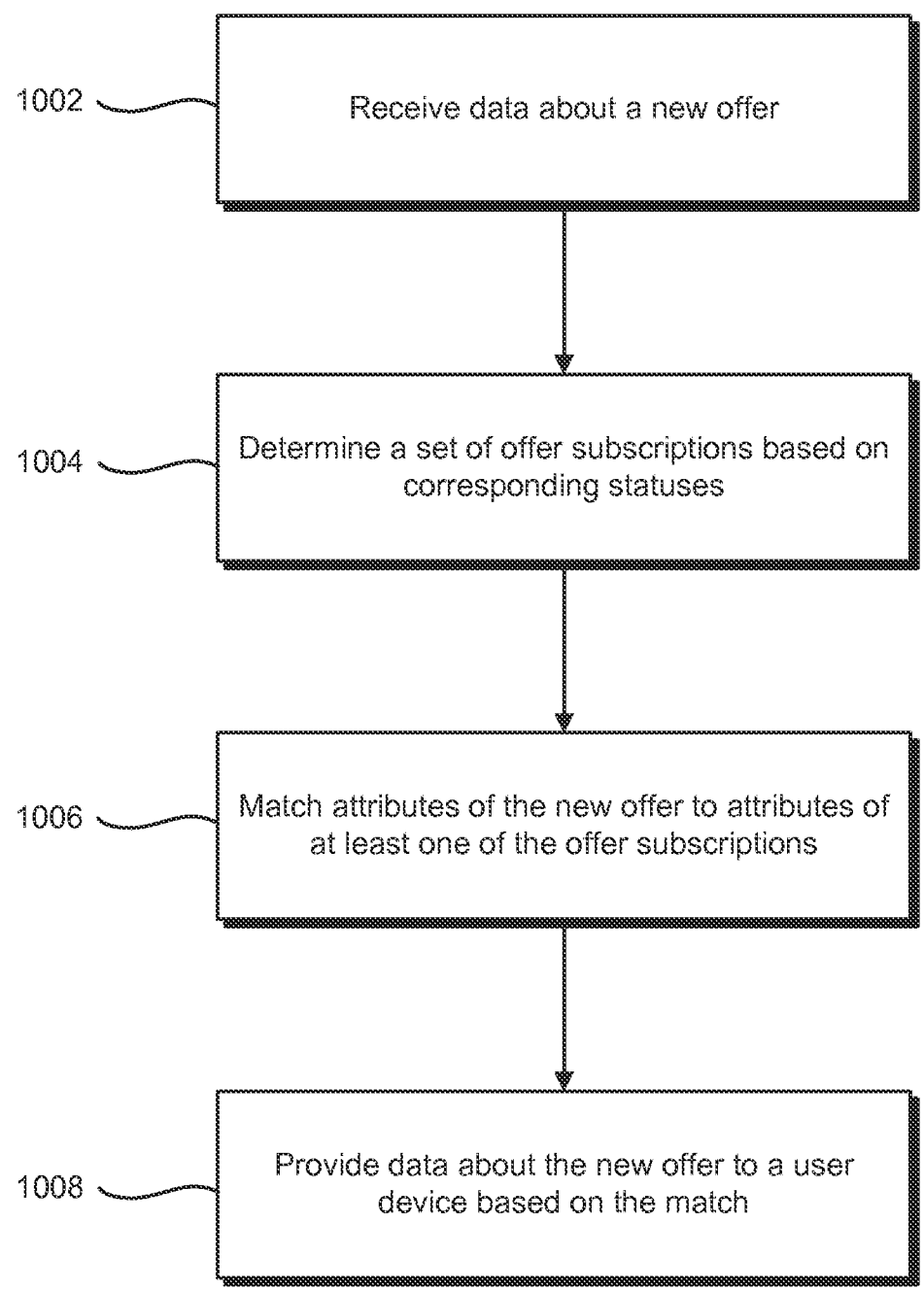
FIG. 10 illustrates an example flow for matching a request for an item with a new offer for the item, according to embodiments.
Figure 11:
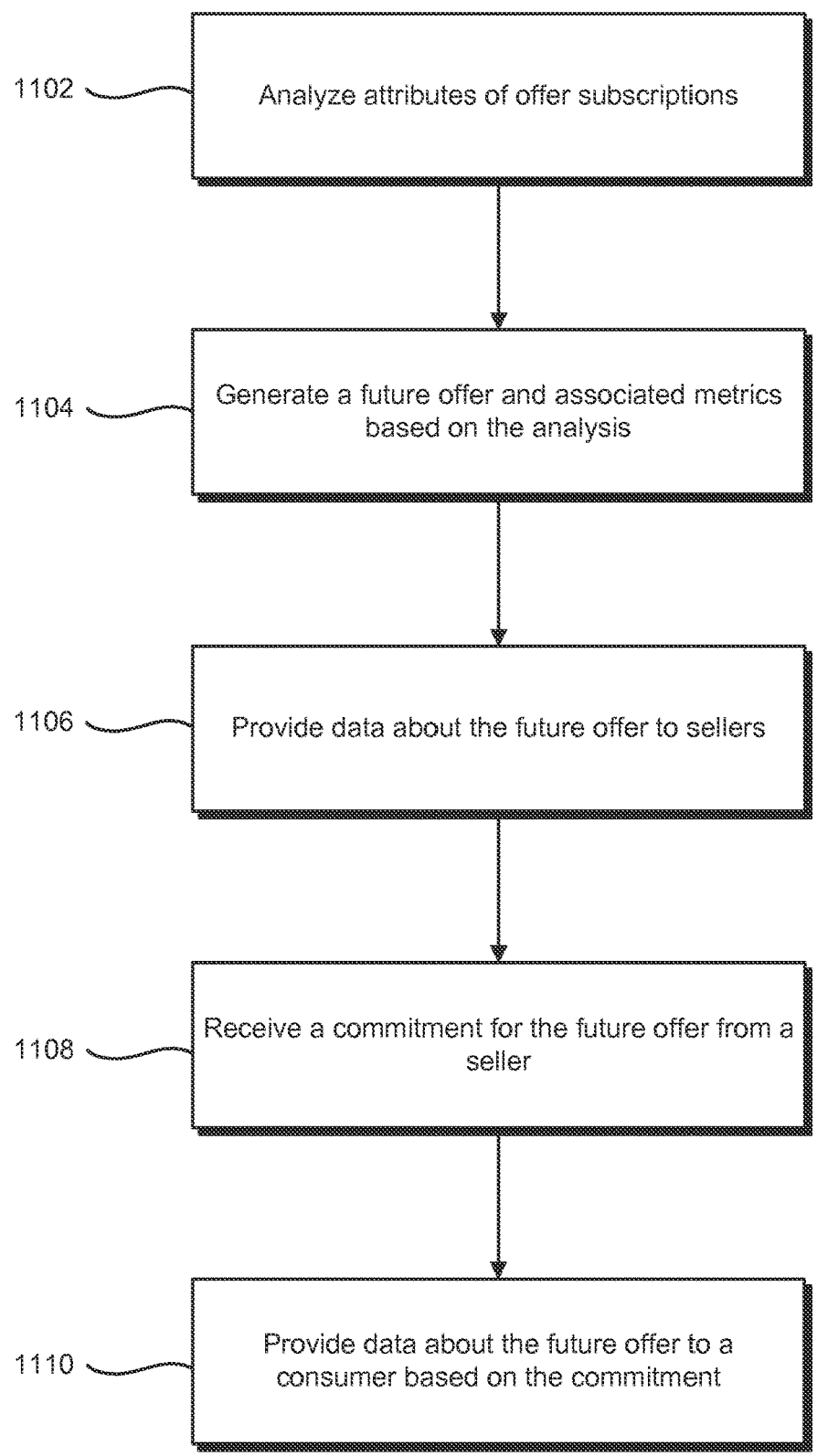
FIG. 11 illustrates another example flow for matching a request for an item with a new offer for the item, according to embodiments.

More particularly, FIG. 8 illustrates an example high-level flow for enabling the requests and the orders. In comparison, FIG. 9 illustrates a more detailed example flow for enabling the requests, while FIGS. 10 and 11 illustrate detailed example flows for enabling the orders based on matching the new offers to the requests. Operations of the example flow of FIG. 8 may be further embodied in operations of the example flows of FIGS. 9-11. Thus, some operations may be similar. Such similarities are not repeated herein in the interest of clarity of explanation.

The example flow of FIG. 8 may start at operation 802, where a service provider device may enable a request for an item offered at an electronic marketplace. The service provider device may be a suitable computing device associated with the electronic marketplace and implementing a request computing service as described herein above. The item may be available for ordering from the electronic marketplace based on a number of available offers. However, the request may be for an unavailable offer for the item from the electronic marketplace. In particular, the request may include a number of requested attributes associated with the unavailable offer. Each of the requested attributes may specify or define an attribute value. Some of the attribute values may be different from corresponding attribute values of the available offers.

To enable such requests to user devices (e.g., consumer devices), the service provider device may provide data about the available offers to the user devices and may configure an interface (e.g., a network-based document such as a webpage) for presenting the available offers at the user devices and for requesting one or more unavailable offers.

At operation 804, the service provider device may receive the request for the unavailable offer. The request may be received from, for example, a user device (e.g., a consumer device). At operation 806, the service provider device may match the received request to a new offer based on one or more of the requested attributes. The new offer may be an offer received from, for example, another user device (e.g., a seller device). In particular, the new offer may have been received after receipt of the request and may include a number of attributes and associated attribute values. The service provider device may match the request to the new offer by, for example, comparing the corresponding attribute and/or attribute values. If the new offer meets or exceeds the request based on the comparison, the service provider device may determine that the two match.

At operation 808, the service provider device may enable the item to be ordered from the electronic marketplace based on the new offer. For example, the service provider device may provide data about the new offer to a user device, a user account, or a user address associated with a user (e.g., a consumer) that may have placed the request. Providing the data may include sending a notification that may describe the new offer and/or the match and that may include an option (e.g., a link) to order the item according to the new offer.

FIG. 9 illustrates an example flow for enabling the request as described at operation 802 of FIG. 8 and for generating an offer subscription based on the request. The offer subscription may be used to match the request to the new offer.

The example flow of FIG. 9 may start at operation 902, where the service provider device may cause a user device (e.g., a consumer device) to present available offers for an item from the electronic marketplace and an option to request an unavailable offer. For example, the service provider device may configure and provide an interface, similar to the one described in FIG. 2, to the user device. The interface may present the available offers and allow a user of the user device to select the option and request the unavailable offer. By requesting the unavailable offer, the user may be able to define an offer for the item, where this offer may not be currently available from the electronic marketplace.

At operation 904, the service provider device may receive a request for the unavailable offer from the user device based on a selection of the option. For example, by selecting the option, the user device may transmit data about making the request to the service provider device. In turn, the service provider device may receive the data and determine that the unavailable offer should be defined.

At operation 906, the service provider device may cause the user device to present an interface for defining attributes associated with the unavailable offers. This interface may be similar to the one described in FIG. 3 and may be configured to present a number of offer-based, item-based, cross item-based, and time-based attributes. The interface may also be configured to allow the user to define some or all of the presented attributes by, for example, inputting, editing, or changing corresponding attribute values. The definitions may be subject to attribute-specific constraints.

When the interface is presented at the user device, some or all of the attribute values may be pre-populated based on an analysis by the service provider device. The analysis may consider a combination of factors. Some of the factors may be associated with whether the request may have been made in association with one available offer or with a plurality of available offers. Other factors may be associated with user data, available offer data, offers of similar items, and past requests for unavailable offers. Generally, the analysis may result in pre-populating the values such that the likelihood of additional user input (e.g., edits or updates) to define the attributes may be reduced, thereby improving the user's experience. In particular, preferences of the user may be estimated and the attribute values may be set to reflect such preferences. If the estimated preferences reflect the user's reason for requesting the unavailable offer, the pre-populated attribute values may likely capture this reason and may not need to be changed.

If the request was made in association with one available offer, the attribute values may be pre-populated with attribute values from that available offer. In comparison, if the request was made in association with a plurality of available offers, the analysis may include determining the attribute values based on attributes values of the plurality of available offers. For example, the best values from these available offers may be selected (e.g., the lowest price, highest seller rating, new condition, etc.). By selecting the best values, the likelihood of additional updates from the user may be reduced. In another example, averages, modes, or some other mathematical formula or statistical analysis may be used.

The analysis may also consider user data. For example, by looking up past orders associated with a user account, determining the associated past offers, and comparing the attribute values of these past offers, user preferences may be determined. These user preferences may be used to pre-populate some or all of the attribute values. For instance, if the analysis indicates that the user tends to purchase "new" items, the condition attribute of the unavailable offer may be set to new.

In addition, the analysis may consider offer data. For example, by analyzing the different available offers, a user preference may be estimated. To illustrate, if all of the available offers are for used or refurbished items at low prices, a determination may be made that the user may prefer a new item. As such, the condition attribute of the unavailable offer may be set to new. In an example, the offer data may include data about other similar items. Items may be similar based on, for instance, belonging to a same category, family, or class of items (e.g., different camera brands with a common set of features). By analyzing the offer data of similar items, popular attributes may be determined. To illustrate, if offers for similar items include a common value for a particular attribute and if that common value is not present in any of the available offers for the item, that particular attribute may be pre-populated with that common value. That may because the missing common value from the available offers may be a potential reason for the request.

Further, the analysis may consider past requests for unavailable offers. These requests may be associated with the users and/or with other users of the electronic marketplace. By analyzing the past requests, user preferences may be determined. The attribute values may be pre-populated according to these user preferences.

At operation 908, the service provider device may receive requested attributes associated with the unavailable offer. For example, the user may operate the user device to edit (as needed) and submit the attribute values at the interface. In turn, the service provider device may receive these values.

At operation 910, the service provider device may generate an offer subscription based on the defined attributes. For example, the service provider device may generate a new record or update an existing record, such as the one described in FIG. 4, with information about the request including, for example, the defined attributes and an identifier of the user. At operation 912, the service provider device may track a status of the offer subscription. For example, the service provider may maintain a status of the offer subscription.

Turning to FIG. 10, the figure illustrates an example flow for matching a request for an unavailable offer with a new offer. In particular, once a new offer is received, the service provider device may look up offer subscriptions with a particular status (e.g., active) and compare the new offer to these offer subscriptions. If a match is found between the new offer and at least one of the offer subscriptions based on, for example, corresponding attributes, the service provider device may match the new offer to the request associated with that subscription offer.

The example flow of FIG. 10 may start at operation 1002, where the service provider device may receive data about a new offer. The data may be received from a user device (e.g., a seller device). The new offer may be an offer that may have been generated at a point in time subsequent to a request for an unavailable offer and that may include a number of defined attributes.

At operation 1004, the service provider device may determine a set of offer subscriptions based on associated statuses. For example, the service provider device may look up a record(s) of offer subscriptions and determine which ones may have an active status.

At operation 1006, the service provider device may match the attributes of the new offer to attributes of at least one of the offer subscriptions from the set. For example, the service provider device may compare the attributes and the attribute values between the new offer and each one of the active offer subscriptions. Based on this comparison, the service provider device may determine whether the new offer meets or exceeds an offer subscription. If so, the service provider may determine that the new offer matches that offer subscription.

At operation 1008, the service provider device may provide data about the new offer to a user device (e.g., a consumer device) associated with the offer subscription based on the match. For example, the offer subscription may include an identifier of a user or a user account that may have requested the associated unavailable offer. Accordingly, the service provider device may transmit a notification about the match to an address or a user device associated with the user or user account.

FIG. 11 illustrates another example flow for matching a request for an unavailable offer with a new offer for an item. In this example flow, the service provider device may provide information about one or more offer subscriptions to a number of sellers. The sellers may accordingly create and submit new offers. As such, the new offers may be more specific or targeted to potential consumers. In one example, the service provider may provide information about individual offer subscriptions to sellers. A new offer created specifically to an offer subscription may be targeted to the corresponding consumer. In a second example, the service provider may provide seller with information common to multiple offer subscriptions. In this example, the service provider may statistically analyze attributes associated with the multiple offer subscriptions to generate a future offer and determine metrics associated with the potential consumers of that future offer. The future offer may represent a potentially popular offer among the potential consumers. The popularity may be quantified in the metrics. The service provider may inform the sellers about the future offers and the consumer metrics and may request the sellers to submit new offers accordingly. A seller may then submit a new offer that may match (meet or exceed) the future offer with the knowledge of the potential consumer base. In both examples, the process for matching the new offer to an offer subscription may be similar. In the interest of clarity of explanation, the operations of the example flow of FIG. 11 are illustrated in light of the second example (a future offer).

The example flow of FIG. 11 may start at operation 1102, where the service provider device may analyze attributes of offer subscriptions. For example, the service provider device may look up active offer subscriptions and perform a statistical analysis of associated attribute values and of requesting users.

At operation 1104, the service provider device may generate a future offer and associated metrics based on the analysis. The future offer may include attributes and associated values based on the offer subscriptions. The metrics may represent data associated with the likelihood of the item being ordered based on the future offer. For example, if ninety percent (or some other percentage) of the offer subscriptions request the item in a new condition and within a particular price range, the future offer may list the condition as new and the price within the price range. In comparison, the metrics may indicate that a new offer with such condition and price may result in a certain amount of orders (e.g., ninety percent×the number of the offer subscriptions).

At operation 1106, the service provider device may provide data about the future offer to user devices, accounts, or addresses of sellers. The data may include the defined attributes of the future offer and the metrics. For example, the service provider device may transmit such data to seller accounts. In return, a seller may operate a user device and access a seller account to retrieve the data. Based on this data, the seller may decide to create a new offer that may meet or exceed the future demand and, accordingly, may operate the user device to generate and submit the new offer.

At operation 1108, the service provider device may receive a commitment for the future offer from at least one the user devices. In one example, the service provider device may receive the new offer from the user device operated by the seller. Receipt of the new offer may represent the commitment. In another example, rather than generating and submitting the new offer, the seller may commit to the future offer. In this example, the service provider device may generate an interface describing the future offer. The interface may be accessible to the seller and may provide a selectable option (e.g., a link) to commit. If that option is selected, the service provider device may set the future offer as a new offer from the seller.

At operation 1110, the service provider device may provide data about the future offer to user devices, accounts, or addresses of consumers based on the commitment. For example, the service provider device may identify the consumers based on the offer subscriptions and may accordingly transmit notifications describing the future offer (or the new offer), identifying the seller(s), and providing an option to order the item based on the future offer.

Figure 12:
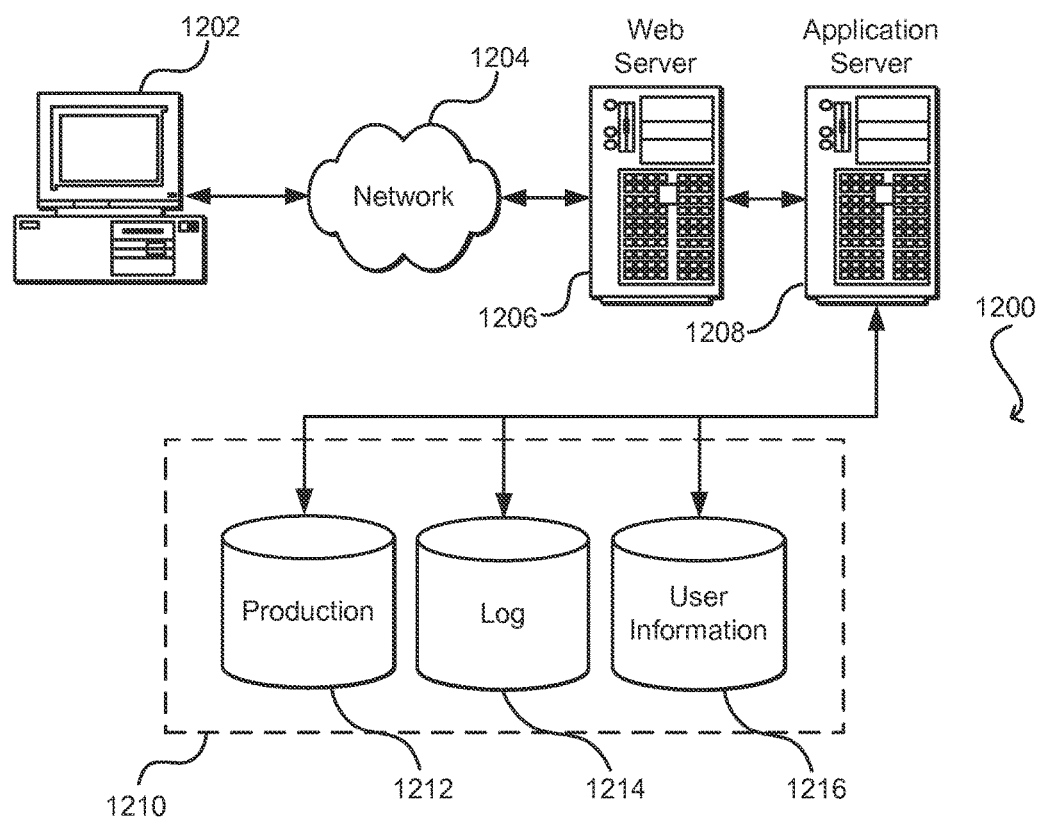
FIG. 12 illustrates an environment in which various embodiments can be implemented.

Turning to FIG. 12, the figure illustrates aspects of an example environment 1200 capable of implementing the above-described structures and functions. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network(s) 1204 and convey information back to a user of the device. Examples of such client devices include personal computers, cell phones, handheld messaging devices, laptop computers, set-top boxes, personal data assistants, electronic book readers, or any other computing device. The network(s) 1204 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, and the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 1208 provides access control services in cooperation with the data store 1210, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1202 and the application server 1208, can be handled by the Web server 1206. It should be understood that the Web and application servers 1206 and 1208 are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store 1210 illustrated includes mechanisms for storing production data 1212 and user information 1216, which can be used to serve content for the production side. The data store 1210 is also shown to include a mechanism for storing log data 1214, which can be used for reporting, analysis, or other such purposes. It should be understood that there can be many other aspects that may need to be stored in the data store 1210, such as for page image information and to access correct information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of environment 1200 in FIG. 12 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   generating, by a computer system associated with an electronic marketplace, a web page configured to present via a graphical user interface of a user device:
   available offers associated with an item, information about the available offers presented on the web page based at least in part on a catalog about the item available from a data storage associated with the electronic marketplace,
   a first option to request a non-existent offer associated with the item based at least in part on a particular offer of the available offers, and
   a second option to request the non-existent offer based at least in part on multiple offers of the available offers, the first option and the second option linked to a web page interface based at least in part on a first web link;
   receiving, by the computer system from the user device via the graphical user interface, a request for the non-existent offer based at least in part on a user selection via the web page of one of the first option or the second option;
   providing, by the computer system to the user device for presentation via the graphical user interface, the web page interface based at least in part on the first web link, the web page interface including fields to define the attributes and a submit option, a field of the fields prepopulated with a definition of an attribute based at least in part on the user selection, the definition using attribute data from the particular offer based at least in part on the user selection being for the first option and on the catalog from the data storage, and the definition using different attribute data common to the multiple offers based at least in part on the user selection being for the second option and on the catalog from the data storage, the submit option linked to a record based at least in part on a second web link, the record stored in the data storage separately from the catalog;
   receiving, by the computer system from the user device via the graphical user interface, definitions of the attributes based at least in part on the fields of the web page interface and on a selection of the submit option;
   generating, by the computer system, an offer subscription that comprises the definitions of the attributes;
   storing, by the computer system, the offer subscription in the record based at least in part on the second web link to the record, the record storing multiple offer subscriptions, the record comprising an identifier and a status of the offer subscription;
   matching, by the computer system, a new offer with the offer subscription in the record based at least in part on the definitions of the attributes and on the status of the offer subscription being active, the new offer generated after receiving the definitions of the attributes; and causing, by the computer system, the user device to present an indication that the new offer matches the non-existent offer, the indication enabling the item to be ordered from the electronic marketplace based at least in part on the new offer.

2. The computer-implemented method of claim 1, wherein the definitions are pre-populated with values based at least in part on historical orders corresponding to a user account associated with the user device, and wherein receiving the definitions comprises receiving edited values or confirmed values corresponding to the definitions.

3. The computer-implemented method of claim 1, further comprising:
   determining that a second definition of a second attribute common to the available offers is unavailable from the available offers; and
   pre-populating a second field of the network page interface with the second definition.

4. The computer-implemented method of claim 1, further comprising:
   generating, by the computer system, a composite offer based at least in part on the offer subscriptions in the record, the composite offer comprising a set of attributes having common definitions across the offer subscriptions;
   generating, by the computer system, a second web page that presents the composite offer to a seller device; and
   providing, by the computer system, a second indication to the user device that the composite offer is available based at least in part on a response from the seller device.

5. One or more non-transitory computer-readable storage media storing computer-executable instructions that, when executed by a computing system, configure the computing system to perform operations comprising:
   generating a web page that presents via a graphical user interface:
      available offers for an item, information about the available offers presented on the web page based at least in part on a catalog about the item available from a data storage associated with a network-based resource,
      a first option to request a non-existent offer for the item based at least in part on a particular offer of the available offers, and
      a second option to request the non-existent offer based at least in part on multiple offers of the available offers of the available offers, the first option and the second option linked to a web page interface based at least in part on a first web link;
   enabling a request from a user device via the graphical user interface for the item based at least in part on providing the web page interface to the user device and on the first web link, the request comprising a requested attribute and a submit option associated with ordering the item based at least in part on a user selection of the first option or the second option, the item unavailable for ordering from the network-based resource based at least in part on the requested attribute, the submit option linked to a record based at least in part on a second web link, the record stored in the data storage separately from the catalog;
   receiving the request from the user device via the graphical user interface;
   generating an offer subscription that comprises the requested attribute;
   storing the offer subscription in the record based at least in part on the second web link to the record, the record storing multiple offer subscriptions, the record comprising an identifier and a status of the offer subscription;
   matching an offer with the offer subscription in the record based at least in part on the requested attribute, the offer generated after receiving the request and comprising the requested attribute; and
   enabling the item to be ordered from the network-based resource based at least in part on the offer.

6. The one or more non-transitory computer-readable storage media of claim 5, wherein enabling the request comprises causing the user device to present the available offers for the item from the network-based resource and the first option and the second option, wherein a selection of the first option or the second option generates the request.

7. The one or more non-transitory computer-readable storage media of claim 6, wherein the request is pre-populated with attributes of the particular offer when the selection is for the first option.

8. The one or more non-transitory computer-readable storage media of claim 6, wherein the request is pre-populated with a combination of attributes from the multiple offers when the selection is for the second option, and wherein the combination is generated by selecting the attributes from the multiple offers based at least in part on reducing a likelihood of updates to the attributes.

9. The one or more non-transitory computer-readable storage media of claim 5, wherein the requested attribute is defined based at least in part on a history of past requests for unavailable offers associated with items from the network-based resource.

10. The one or more non-transitory computer-readable storage media of claim 5, wherein enabling the request comprises causing the user device to present the available offers, and wherein the requested attribute is defined based at least in part on attributes of the available offers.

11. The one or more non-transitory computer-readable storage media of claim 5, wherein the requested attribute is defined based at least in part on user input, wherein the user input is constrained.

12. The one or more non-transitory computer-readable storage media of claim 5, wherein the requested attribute comprises at least one of an offer-based attribute, an item-based attribute, a time-based attribute, or a cross item-based attribute.

13. The one or more non-transitory computer-readable storage media of claim 5, wherein enabling the item to be ordered from the network-based resource comprises providing a notification including an option to order the item based at least in part on the requested attribute, wherein the notification comprises at least one of an email, a text message, an audible message, an alert to an application associated with the network-based resource, or a recommendation within a session with the network-based resource.

14. A system, comprising:
   a memory configured to store computer-executable instructions; and
   a processor configured to access the memory and execute the computer-executable instructions to collectively at least:
      generate a web page that presents via a graphical user interface:

available offers for an item, information about the available offers presented on the web page based at least in part on a catalog about the item available from a data storage associated with a network-based resource,
a first option to request a non-existent offer for the item based at least in part on a particular offer of the available offers, and
a second option to request the non-existent offer based at least in part on multiple offers of the available offers of the available offers, the first option and the second option linked to a web page interface based at least in part on a first web link;
enable a request from a user device via the graphical user interface for the non-existent offer based at least in part on providing the web interface page to the user device and on the first web link, the request comprising a option linked to a record based at least in part on a second web link, the record stored in the data storage separately from the catalog;
determine attributes associated with the non-existent offer based at least in part on receiving the request via the graphical user interface;
generate an offer subscription that comprises the attributes;
store the offer subscription in the record based at least in part on the second web link to the record, the record storing multiple offer subscriptions, the record comprising an identifier and a status of the offer subscription;
match a new offer with the offer subscription in the record based at least in part on the attributes, the new offer generated after receiving the request; and
enable the item to be ordered from the network-based resource based at least in part on the new offer.

15. The system of claim 14, wherein matching the new offer comprises:
determining that the status of the offer subscription is active; and
comparing the attributes to corresponding attributes of the new offer.

16. The system of claim 14, wherein the computer-executable instructions, when executed by the processor, further cause the system to:
update the record to include the offer subscription, the status, and an identifier of a user associated with the user device.

17. The system of claim 16, wherein matching the new offer comprises:
generating a list of preferred attributes based at least in part on the offer subscription and other offer subscriptions in the record and based on corresponding statuses;
generating metrics associated with the preferred attributes based at least in part on analyzing occurrences of the preferred attributes across the record; and
providing the list of preferred attributes and the metrics to computing devices associated with seller accounts, the providing enabling the new offer to be generated and to include the preferred attributes.

18. The system of claim 16, wherein the status of the offer subscription comprises at least one of: active, fulfilled, offered, declined, or expired.

19. The system of claim 14, wherein enabling the item to be ordered comprises providing an option to at least order the item based at least in part on the new offer.

20. The system of claim 14, wherein enabling the item to be ordered comprises automatically ordering the item and providing an option to cancel a resulting automatic order.

* * * * *

UNITED STATES PATENT AND TRADEMARK OFFICE
CERTIFICATE OF CORRECTION

PATENT NO. : 10,223,721 B1
APPLICATION NO. : 14/631579
DATED : March 5, 2019
INVENTOR(S) : Sandeep Bhatia Page 1 of 1

It is certified that error appears in the above-identified patent and that said Letters Patent is hereby corrected as shown below:

In the Claims

Column 23, Lines 49-50, Claim 5:
Delete: "at least in part on multiple offers of the available offers of the available offers, the first option and the"
Insert: --at least in part on multiple offers of the available offers, the first option and the--

Column 25, Line 11, Claim 14:
Delete: "available offers of the available offers, the first"
Insert: --available offers, the first--

Signed and Sealed this
Third Day of September, 2019

Andrei Iancu
*Director of the United States Patent and Trademark Office*